United States Patent
Choi et al.

(10) Patent No.: US 11,695,564 B2
(45) Date of Patent: Jul. 4, 2023

(54) SYSTEM AND METHOD FOR VERIFYING USER BY SECURITY TOKEN COMBINED WITH BIOMETRIC DATA PROCESSING TECHNIQUES

(71) Applicant: INDUSTRY FOUNDATION OF CHONNAM NATIONAL UNIVERSITY, Gwangju (KR)

(72) Inventors: Deok Jai Choi, Gwangju (KR); Thao Mai Dang, Gwangju (KR); Thuc Dinh Nguyen, Ho Chi Minh (VN)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 353 days.

(21) Appl. No.: 17/135,487

(22) Filed: Dec. 28, 2020

(65) Prior Publication Data
US 2022/0158838 A1    May 19, 2022

(30) Foreign Application Priority Data
Nov. 19, 2020   (KR) .......................... 10-2020-0155203

(51) Int. Cl.
| | |
|---|---|
| H04L 29/06 | (2006.01) |
| H04L 9/32 | (2006.01) |
| G06N 3/02 | (2006.01) |
| G06V 40/50 | (2022.01) |
| G06N 5/01 | (2023.01) |

(52) U.S. Cl.
CPC ............. *H04L 9/3231* (2013.01); *G06N 3/02* (2013.01); *G06N 5/01* (2023.01); *G06V 40/50* (2022.01); *H04L 9/3236* (2013.01)

(58) Field of Classification Search
CPC ................. H04L 9/3297; H04L 67/288; H04L 2209/38
See application file for complete search history.

(56) References Cited

U.S. PATENT DOCUMENTS

| | | | |
|---|---|---|---|
| 10,685,008 B1 * | 6/2020 | Kurve ..................... | G06F 16/23 |
| 2008/0178008 A1 * | 7/2008 | Takahashi .............. | G07C 9/257 |
| | | | 713/186 |
| 2009/0074259 A1 * | 3/2009 | Baltatu ................ | G06V 40/172 |
| | | | 382/118 |
| 2015/0003732 A1 * | 1/2015 | Kumar ................. | G06Q 20/227 |
| | | | 382/182 |

(Continued)

FOREIGN PATENT DOCUMENTS

KR   10-1311310 B1   9/2013

OTHER PUBLICATIONS

Thao M. Dang "FEHash: Full Entropy Hash for Face Template Protection", 2020 IEEE/CVF Conference on Computer Vision and Pattern Recognition Workshops (CVPRW); published on Jun. 19, 2020, pp. 3527-3536.

*Primary Examiner* — Taghi T Arani
*Assistant Examiner* — Lin Chang
(74) *Attorney, Agent, or Firm* — You & IP, LLC; Wansik You

(57) ABSTRACT

Embodiments of the inventive concept provide a system and method that verifies a user through a security token combined with biometric information processing techniques capable of changing and canceling the conventional encryption key without storing biometric information-related data corresponding to a user's personal information.

15 Claims, 11 Drawing Sheets

(56) References Cited

U.S. PATENT DOCUMENTS

2021/0034729 A1* 2/2021 Chung .................... G06F 21/32
2021/0135854 A1* 5/2021 Karame ................ H04L 9/3247
2021/0353149 A1* 11/2021 Abbosh ................ A61B 5/0042

* cited by examiner

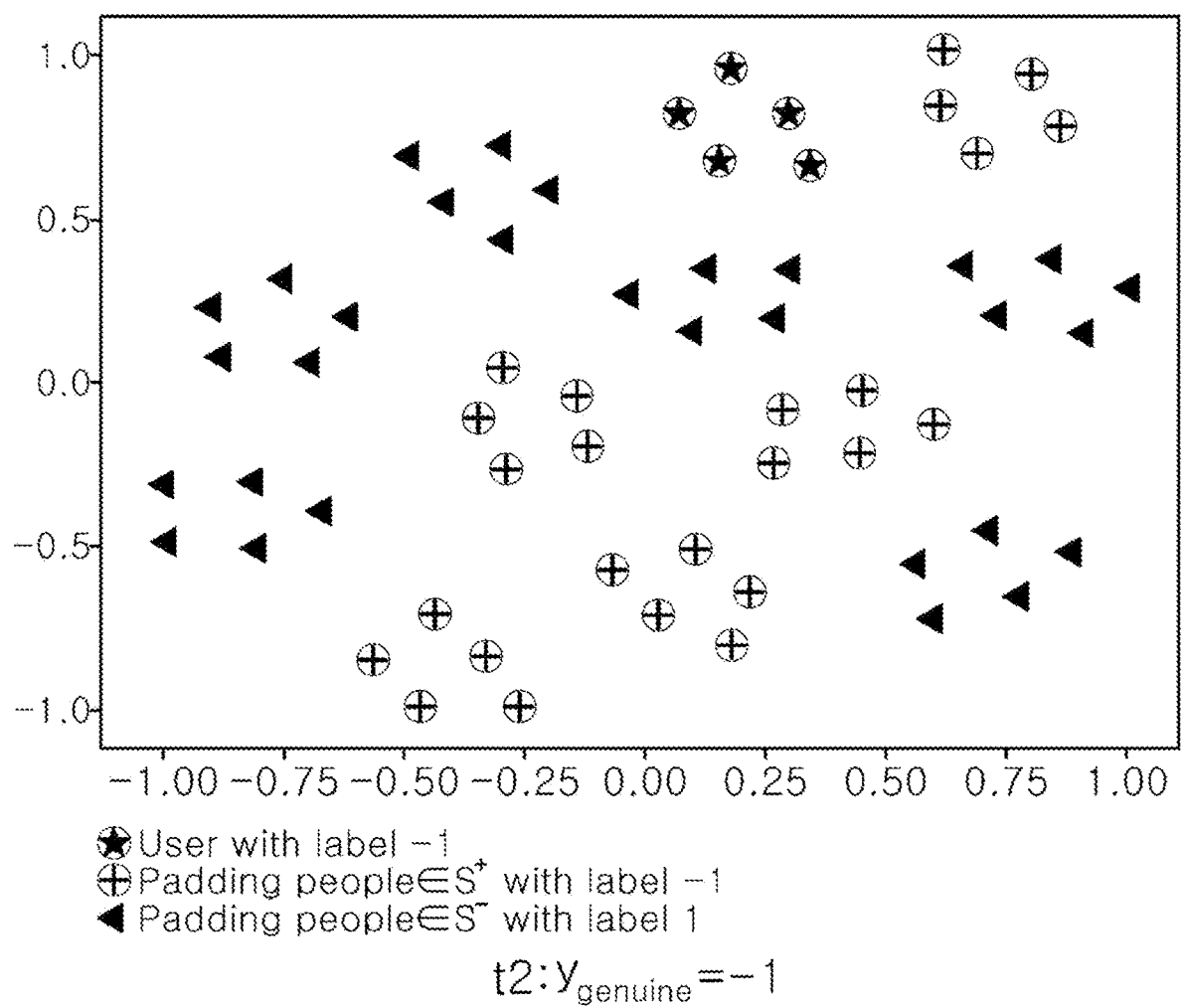

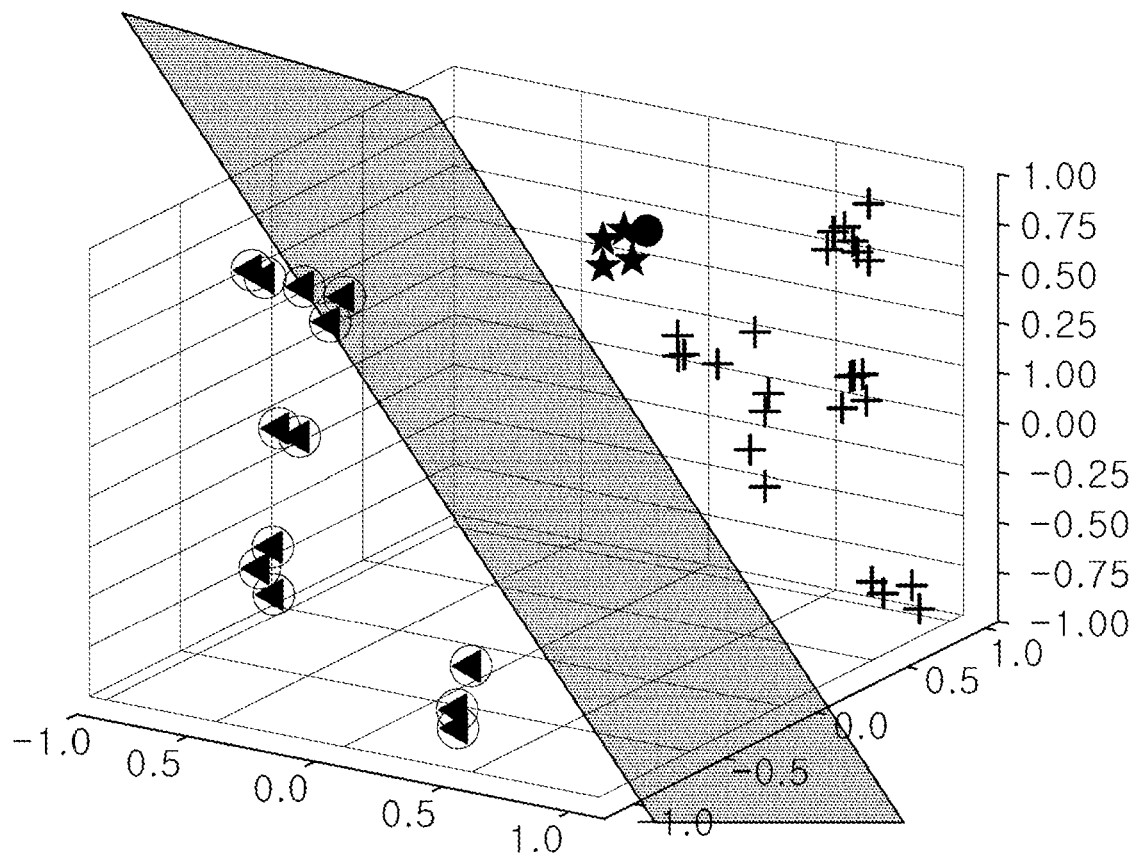

SYSTEM AND METHOD FOR VERIFYING USER BY SECURITY TOKEN COMBINED WITH BIOMETRIC DATA PROCESSING TECHNIQUES

CROSS-REFERENCE TO RELATED APPLICATIONS

A claim for priority under 35 U.S.C. § 119 is made to Korean Patent Application No. 10-2020-0155203 filed on Nov. 19, 2020 in the Korean Intellectual Property Office, the entire contents of which are hereby incorporated by reference.

BACKGROUND

Embodiments of the inventive concept described herein relate to a system and method that verifies a user by a security token combined with biometric information processing techniques.

Nowadays, the robustness of most security systems depends on the strength (i.e., randomness or length) of the security token. However, because it is difficult to memorize complex security tokens, most users employ simple or meaningful security tokens. Accordingly, it is easy for enemies to predict the security tokens.

Such the issues may be overcome using a biometric encryption method. However, the exposure of biometric information may cause very serious risks. Furthermore, the unchanging biometric information makes it impossible to change or cancel an encryption key that needs to have the possibility of change, the possibility of cancellation, or the like.

Accordingly, there is a need for the biometric encryption method capable of changing and canceling the conventional encryption key without storing biometric information-related data corresponding to a user's personal information.

SUMMARY

Embodiments of the inventive concept provide a system and method that verifies a user through a security token combined with biometric information processing techniques capable of changing and canceling the conventional encryption key without storing biometric information-related data corresponding to a user's personal information.

However, the problem to be solved by the inventive concept is not limited to the above-described problem as described above, and other problems may be present.

According to an exemplary embodiment, a user verifying method by a security token combined with biometric information processing techniques, which is performed by a server includes receiving an enrollment request signal including biometric information for enrollment from a user terminal, extracting feature information from the biometric information for the enrollment and biometric information of a plurality of other persons, embedding the feature information extracted from the biometric information for the enrollment and the biometric information of the plurality of other persons, generating a projection parameter and a decision hyperplane parameter based on the embedding result, storing the projection parameter and the decision hyperplane parameter, generating a first template (template, pk) by applying a cryptographic hashing function to a pre-generated first key (key, s), storing the generated first template (pk), receiving a verification request signal including biometric information for verification from the user terminal, extracting feature information from the biometric information for the verification, embedding the feature information extracted from the biometric information for the verification, generating a second key (key, s') corresponding to the first key (s) based on the embedding result, generating a second template (template, pk') by applying the cryptographic hashing function to the second key (s'), comparing the first template (pk) with the second template (pk'), and completing user verification based on the comparison result.

The generating of the projection parameter and the decision hyperplane parameter includes generating the projection parameter and the decision hyperplane parameter by applying Full Entropy Hash (FEHash) to the result of embedding the feature information extracted from the biometric information for the enrollment, and the biometric information of the plurality of other persons. The generating of the second key (key, s') includes generating the second key (key, s') by applying the FEHash to the result of embedding the feature information extracted from the biometric information for the verification by using the projection parameter and the decision hyperplane parameter.

In the inventive concept, the FEHash may include Random Fourier Feature Mapping (RFFM) and Linear Support Vector Machine (Linear SVM).

In the inventive concept, the generating of the projection parameter and the decision hyperplane parameter may include performing high-dimensional mapping by applying the RFFM to the result of embedding the feature information extracted from the biometric information for the enrollment and the biometric information of the plurality of other persons, determining the same number of hyperplanes as a bit string of the first key (s) by applying the Linear SVM to the mapping result, and generating the projection parameter based on the mapping result and generating the decision hyperplane parameter based on the determination result.

In the inventive concept, the extracting of the feature information from the biometric information for the enrollment and the biometric information of the plurality of other persons may include padding the feature information extracted from the biometric information of the plurality of other persons.

In the inventive concept, the embedding of the feature information extracted from the biometric information for the enrollment and the biometric information of the plurality of other persons may include selecting 'q' persons among the plurality of other persons based on a length (m) of the first key (s), allocating a binary label identical to a binary label of a user to the selected 'q' persons, and allocating a binary label, which are not identical to the binary label of the user, to the remaining persons (p-q' persons) selected among the plurality of other persons.

In the inventive concept, the selecting of the 'q' persons may include selecting the 'q' persons according to an equation below.

pCq>=m (Here, 'C' means a combination; 'p' is the number of other persons. 'q' is the number of persons selected among the plurality of other persons. 'm' is the length of the first key (s)).

In the inventive concept, the first key (s) may be composed of a random binary string.

In the inventive concept, the projection parameter may include a random matrix ($\Omega$) and a random vector (r), and the decision hyperplane parameter may include a vector (w) and a scalar value (b).

In the inventive concept, the comparing may include determining whether the first template (pk) is identical to the second template (pk').

In the inventive concept, the completing of the user verification may include completing the user verification by determining that a user is a normal user, when the first template (pk) is identical to the second template (pk').

In the inventive concept, the extracting of the feature information from the biometric information for the enrollment and the biometric information of the plurality of other persons may include extracting the feature information extracted from the biometric information for the enrollment and the biometric information of the plurality of other persons, using convolutional neural network (CNN).

According to an exemplary embodiment, a computer program which is coupled to a computer and which is stored in computer-readable recording medium, to perform the user verifying method by a security token combined with biometric information processing techniques.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
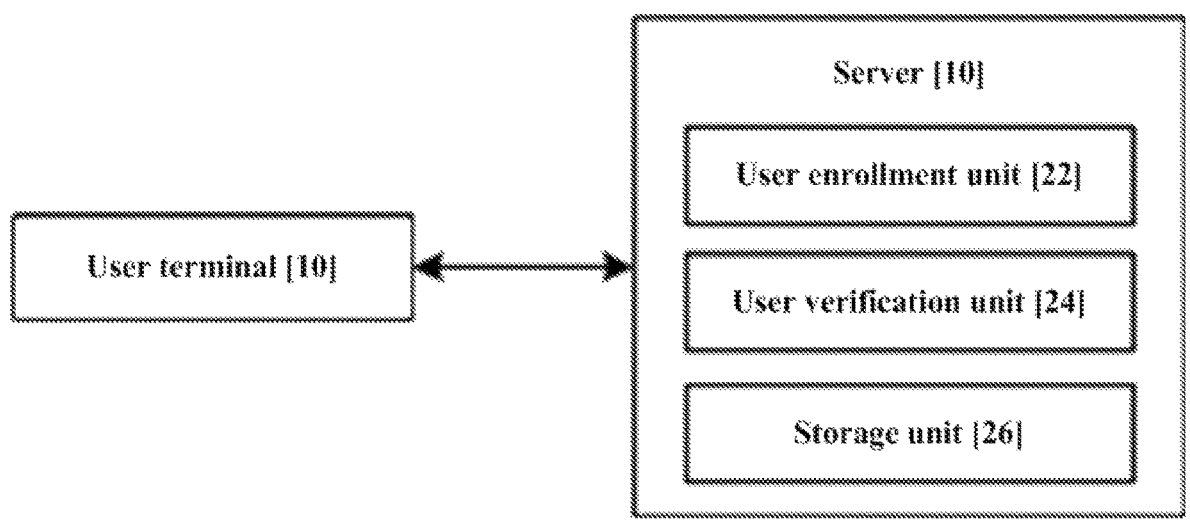
FIG. 1 is a conceptual diagram for describing a user verification system by a security token combined with biometric information processing techniques according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the concept of the inventive concept to those skilled in the art. The inventive concept may be defined by scope of the claims.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the inventive concept will be described in detail with reference to accompanying drawings.

FIG. 1 is a conceptual diagram for describing a user verification system by a security token combined with biometric information processing techniques according to an embodiment of the inventive concept.

Figure 2:
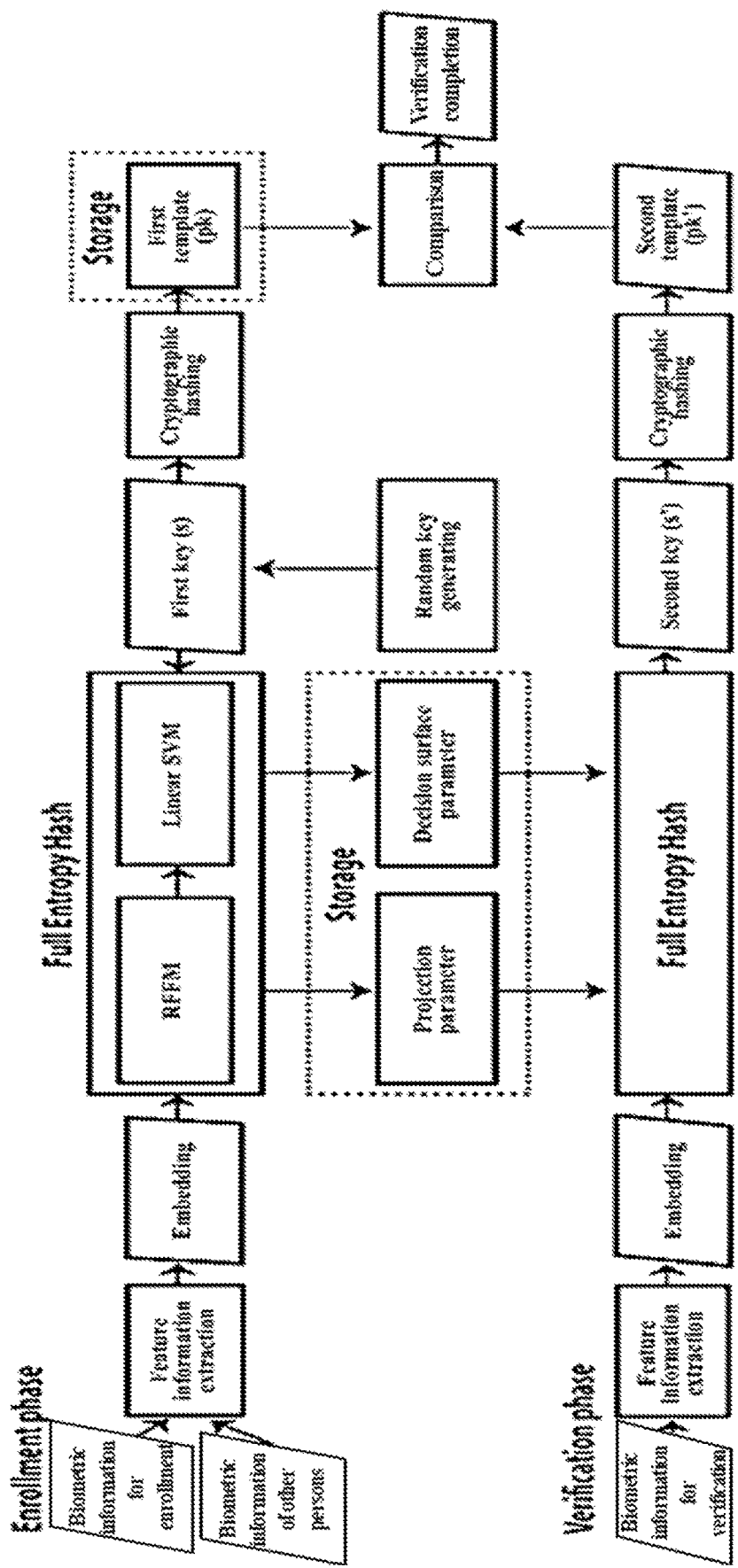
FIG. 2 is a diagram illustrating an overall process of user verification by a security token combined with biometric information processing techniques according to an embodiment of the inventive concept.

FIG. 2 is a diagram illustrating an overall process of user verification by a security token combined with biometric information processing techniques according to an embodiment of the inventive concept.

Figure 3:
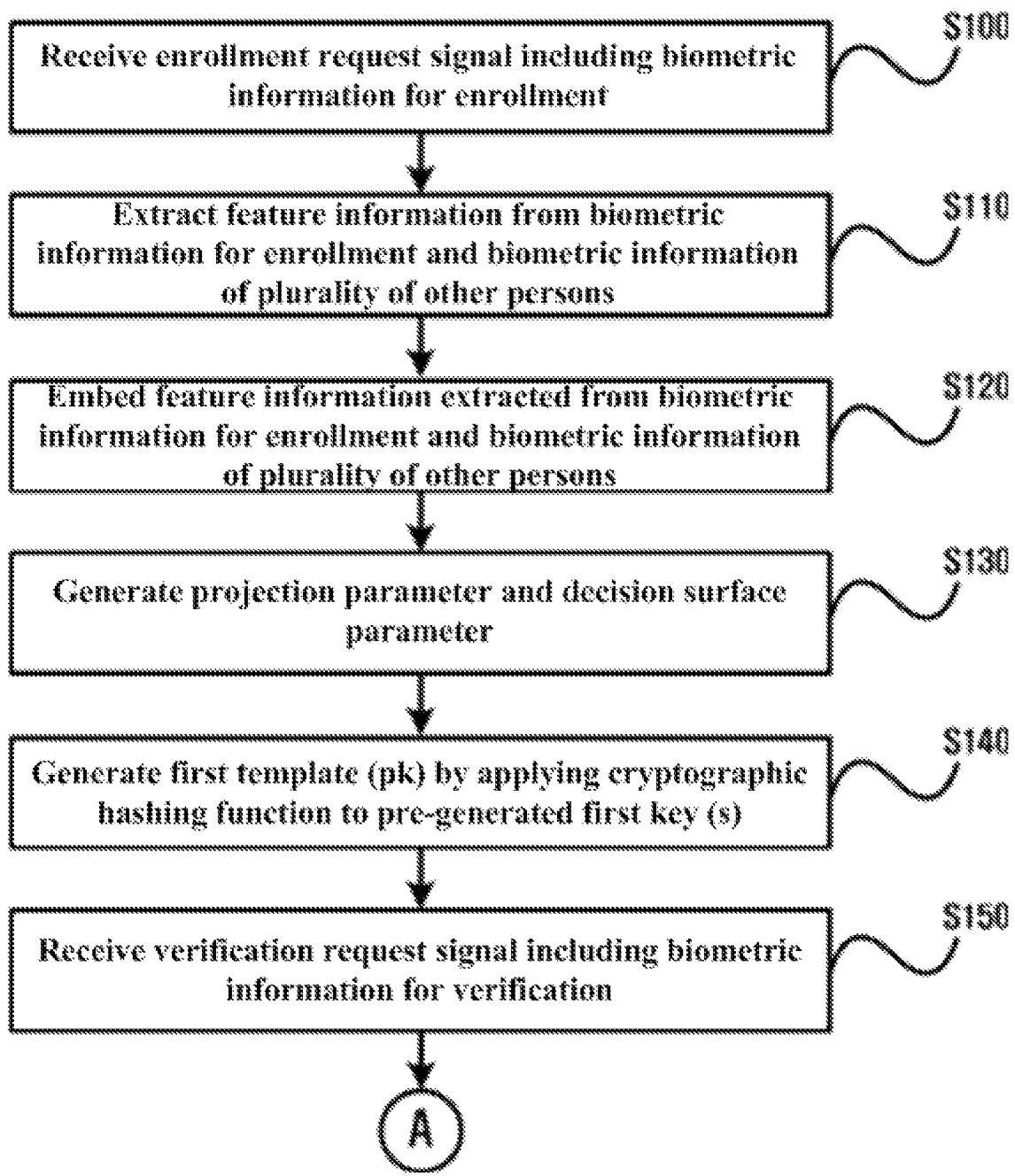
FIGS. 3 and 4 are flowcharts of a method for verifying a user by a security token combined with biometric information processing techniques according to an embodiment of the inventive concept.
Figure 4:
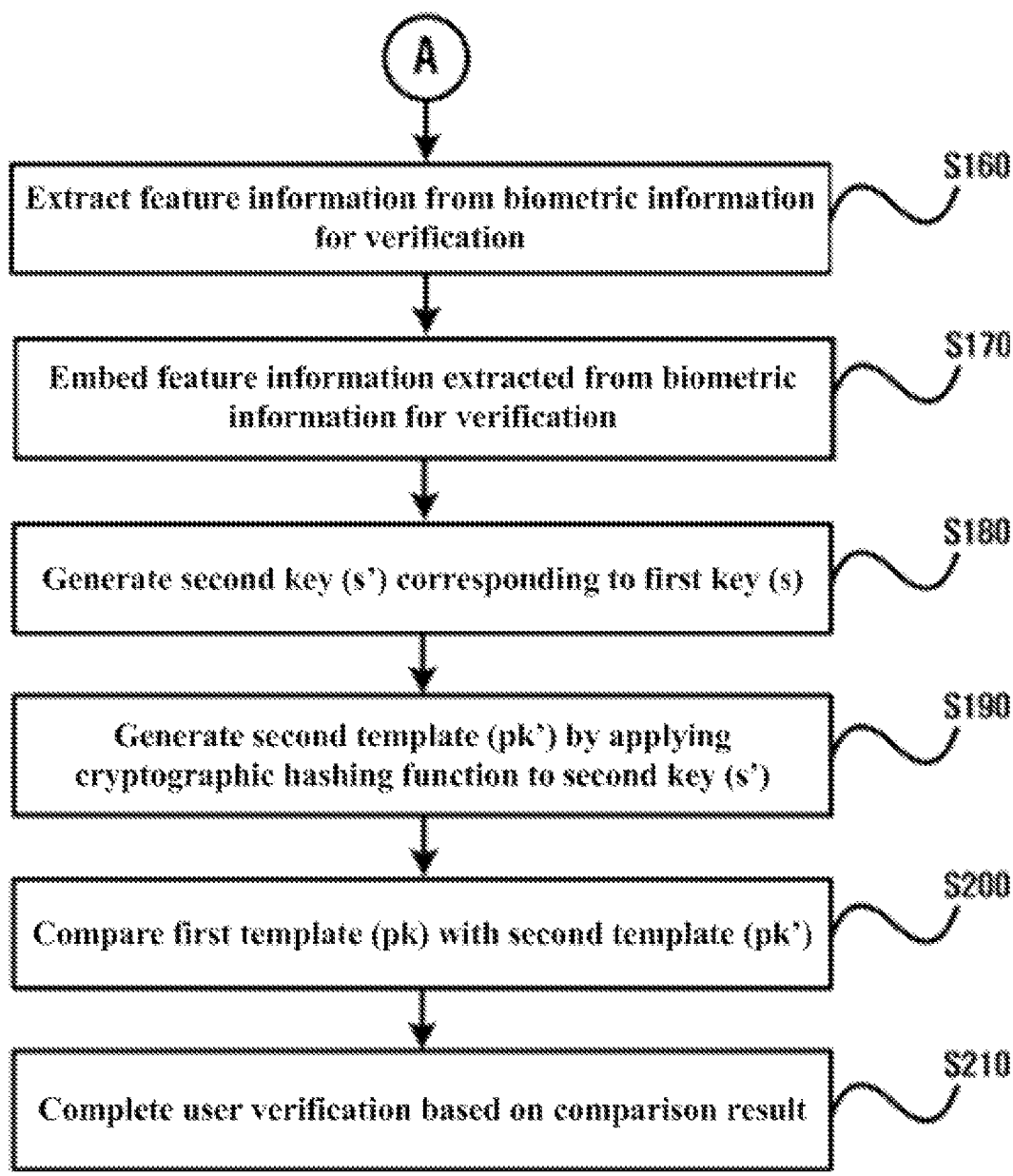

FIGS. 3 and 4 are flowcharts of a method for verifying a user by a security token combined with biometric information processing techniques according to an embodiment of the inventive concept.

Figure 5:
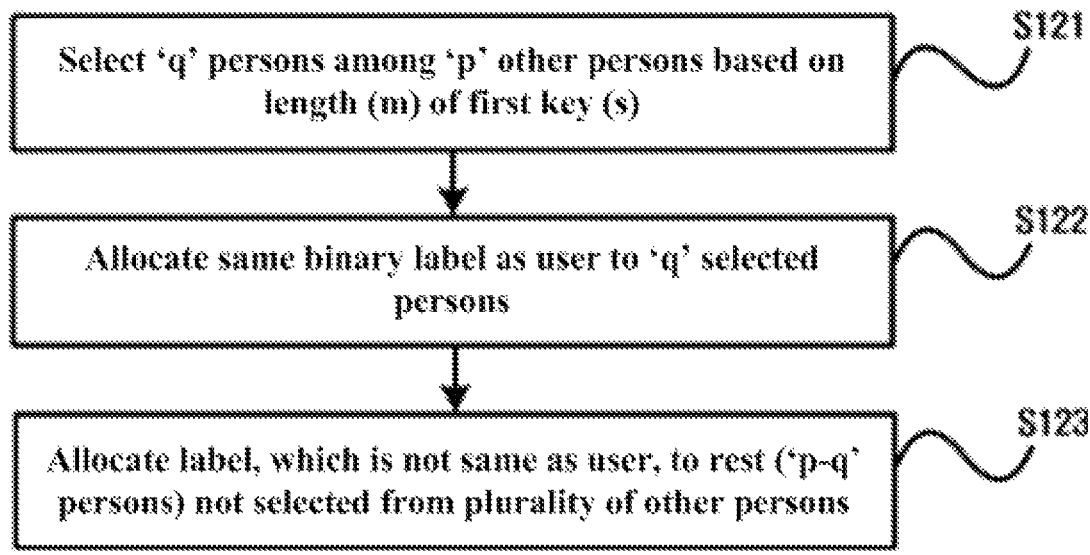
FIG. 5 is a flowchart of a detailed method of operation S120 of FIG. 3.

FIG. 5 is a flowchart of a detailed method of operation S120 of FIG. 3.

Figure 6:
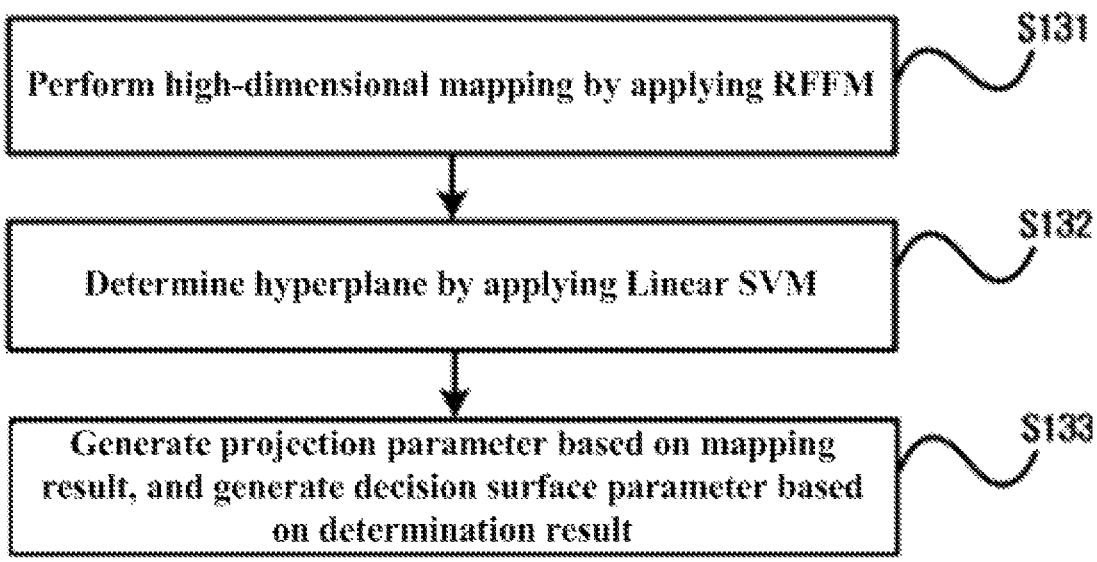
FIG. 6 is a flowchart of a detailed method of operation S130 of FIG. 3.

FIG. 6 is a flowchart of a detailed method of operation S130 of FIG. 3.

FIGS. 7 to 10 are diagrams for describing a Full Entropy Hash (FEHash) according to an embodiment of the inventive concept.

Referring to FIG. 1, a user verification system by a security token combined with biometric information processing techniques may include a user terminal 10 and a server 20. In FIG. 1, the user terminal 10 and the server 20 may be seen as being separated from each other but may be logically separated from each other. The user terminal 10 and the server 20 may be physically the same device or may be physically separated from each other. Communication methods available in the case where the user terminal 10 and the server 20 are physically separated from each other are listed below as an example. The communication methods may not include all cases.

The user terminal 10 and the server 20 may transmit and receive data while being synchronized in real time using a wireless communication network. The wireless communication network may support various long-distance communication methods. For example, various communication methods such as Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTEA), Wireless Mobile Broadband Service (WMBS), Bluetooth Low Energy (BLE), Zigbee, Radio Frequency (RF), Long Range (LoRa), and the like may be applied to the wireless communication network, but are not limited thereto. Various widely-known wireless communication or mobile communication methods may be applied to the wireless communication network.

In the inventive concept, the user terminal 10 may include various portable electronic communication devices supporting communication with the server 20. For example, a separate smart device may include various terminals such as a smart phone, a personal digital assistant (PDA), a tablet, a wearable device (e.g., a watch-type terminal (a smart watch), a glass-type terminal (a smart glass), head mounted display (HMD), or the like), and various Internet of Things (IoT) terminals, but is not limited thereto.

In the inventive concept, the user terminal 10 may mean a device requiring security. For example, the user terminal 10 may be a mobile phone, an access control device, or the like.

In the inventive concept, the user terminal 10 may mean a device in which an app requiring security is installed or embedded. For example, the user terminal 10 may be a mobile phone in which a financial app is installed.

The user terminal 10 requests the server 20 to enroll and verify a user.

The user terminal 10 transmits an enrollment request signal including a user's biometric information for enrollment to the server 20. The user terminal 10 transmits a verification request signal including biometric information for verification to the server 20.

Here, the biometric information means unique information of the user and may be, for example, a face image, an iris, a fingerprint, or the like.

In the inventive concept, the user terminal 10 may include a biometric information acquisition unit (not illustrated) of the user.

For example, the user terminal 10 may include a camera as the biometric information acquisition unit. The user terminal 10 may obtain the user's face image through the camera.

The user terminal 10 may make a request for user enrollment by providing the server 20 with the user's biometric information for enrollment obtained through the biometric information acquisition unit. The user terminal 10 may make a request for user verification by providing the server 20 with the user's biometric information for verification obtained through the biometric information acquisition unit.

For example, the user terminal 10 may make a request for user enrollment by providing the server 20 with the user's face image for enrollment captured through a camera. The user terminal 10 may make a request for user verification by providing the server 20 with the user's face image for verification captured through the camera.

The user terminal 10 performs approval or rejection depending on the user verification result.

When it is determined by the server 20 that the user is a normal user, the user terminal 10 approves the user.

In the case where the user terminal 10 is a mobile phone, the user may use the mobile phone when the user is approved.

In the case where the user terminal 10 is an access control device, the user may pass through the access control device when the user is approved.

In the case where an app is installed or embedded in the user terminal 10, the user may access the app when the user is approved.

When it is determined by the server 20 that the user is an abnormal user, the user terminal 10 rejects the user.

In the case where the user terminal 10 is a mobile phone, the user may not use the mobile phone when the user is rejected.

In the case where the user terminal 10 is an access control device, the user may not pass through the access control device when the user is rejected.

In the case where an app is installed or embedded in the user terminal 10, the user may not access the app when the user is rejected.

Referring to FIG. 1, the server 20 includes a user enrollment unit 22, a user verification unit 24, and a storage unit 26.

However, the server 20 according to an embodiment of the inventive concept may include fewer or more components than the components illustrated in FIG. 1.

When receiving an enrollment request signal including the user's biometric information for enrollment from the user terminal 10, the user enrollment unit 22 generates and stores a random matrix ($\Omega$) and a random vector (r) used in a process of performing high-dimensional mapping by applying FEHash to the received-and-processed biometric information.

In other words, the user enrollment unit 22 converts the dimension into a high dimension by applying a random matrix ($\Omega$) and a random vector (r) to the received-and-processed biometric information, and then finds a division plane capable of dividing a group to which the user belongs, and the remaining groups, such that the length of a first key (key, s) is matched with the value of each bit of the first key (key, s). At this time, the user enrollment unit 22 finds a vector (w) and a scalar value (b) constituting the division plane to store a set of these values. The elements of the set of values are the number of lengths of the first key (key, s), and each element becomes $\Omega$, r, w, and b.

The user enrollment unit 22 performs cryptographic hashing on the first key (key, s), and generate a first template (pk) to complete the enrollment. Here, the first key (s) refers to a binary key that is generated by a random key generator and has a predetermined length. For example, the first key (s) may be generated with a length of 255 bits, but is not limited thereto.

When receiving a verification request signal including the user's biometric information for verification from the user terminal 10, the user verification unit 24 generates a second key (s') by applying FEHash to the biometric information for verification, generates a second template (pk') by performing cryptographic hashing on the generated second key (s'), and completes user verification by comparing the generated second template with the first template generated in the enrollment process.

Here, the second key (s') corresponds to the first key (s). That is, the second key (s') is generated with the same length as the first key (s). For example, when the first key (s) has 255 bits, the second key (s') may also be generated with the length of 255 bits.

When the user is a normal user, the second key (s') is generated such that the bit string of the second key (s') is identical to the bit string of the first key (s). When cryptographic hashing is performed, the second template (pk') identical to the first template (pk) is generated. Accordingly, the user verification unit 24 may approve the user verification by determining that the user's access is a normal access (determining that the user to be verified is a normal user).

When the user is an abnormal user, the second key (s') is generated such that the bit string of the second key (s') is different from the bit string of the first key (s). When cryptographic hashing is performed, the second template (pk') different from the first template (pk) is generated. Accordingly, the user verification unit 24 returns the user verification as "negative" by determining that the user's access is an abnormal access (determining that the user to be verified is an abnormal user).

The storage unit 26 stores parameters ($\Omega$, r, w, b) as much as the length of the first key (key, s) generated as FEHash is applied during user enrollment, and stores the first template (pk).

Accordingly, the user verification unit 24 may generate the second key (s'), using a plurality of stored parameter values, and may perform user verification by comparing the stored first template (pk) with the second template (pk').

Because the user's biometric information is not stored in the storage unit 26, but a plurality of parameter values, which are completely independent of user biometric information, and a first template (pk) from applying cryptographic hashing to the first key (key, s) are stored, there is no risk of exposing the user's biometric information and first key (key, s).

Hereinafter, it will be described in detail with reference to FIGS. 2 to 10 that the server 20 performs user enrollment and verification using biometric information. For convenience, it may be described that each step is performed by the server 20, but each step may be appropriately performed by the user enrollment unit 22 or the user verification unit 24.

First of all, referring to FIG. 3, the server 20 receives an enrollment request signal including the user's biometric information for enrollment from the user terminal 10 (S100).

Next, the server 20 extracts feature information from the user's biometric information for enrollment and pieces of biometric information of a plurality of other persons (S110).

Herein, the pieces of biometric information of other persons may be data stored in the storage unit 26, and pieces of biometric information of persons that are capable of being arbitrarily obtained may be used. That is, the server 20 stores pieces of biometric information of a large number of persons in the storage unit 26, and then randomly selects the pieces of biometric information of a plurality of other persons different from the user to use the pieces of biometric information as noise information, upon enrolling the user. For common biometrics (as face), the server 20 may randomly download the pieces of biometric information of other persons directly on the internet.

The server 20 may extract feature information, using a convolutional neural network (CNN). That is, the server 20 extracts feature information of the user's biometric information for enrollment using the CNN, and extracts feature information from each of pieces of biometric information of a plurality of other persons using the CNN.

Herein, the CNN is a well-known technique associated with deep learning, and thus the detailed descriptions will be omitted.

Moreover, as described above, it is described that the CNN is used to extract feature information, but is not limited thereto. Various deep learning techniques may be used.

In S110, the server 20 pads the feature information extracted from the pieces of biometric information of a plurality of other persons.

Here, the padding is made in a procedure of generating training data for performing FEHash.

The server 20 lists the feature information extracted from the user's biometric information for enrollment together with pieces of feature information extracted from the biometric information of a plurality of others, in an input space.

After that, the server 20 embeds the feature information extracted from the user's biometric information for enrollment and the pieces of biometric information of a plurality of other persons, which are listed in the input space (S120).

Here, the embedding refers to a procedure of converting the feature information into binary information.

Referring to FIG. 5, the server 20 selects 'q' persons among 'p' other persons based on the length (m) of the first key (s) (S121).

At this time, the plurality of other persons indicate those who are randomly selected in S110 and provide biometric information as noise information.

The server 20 randomly selects 'q' persons from 'p' persons depending on the following equation.

$$pCq >= m$$

Herein, 'C' means a combination; 'p' is the number of other persons; 'q' is the number of persons selected from the plurality of other persons; 'm' is the length of the first key (s).

The number of cases in each of which 'q' persons are capable of being selected from 'p' persons is pCq. At this time, pCq needs to be greater than or equal to the length (m) of the first key (s).

In this way, after 'q' persons are selected from 'p' persons throughout the same number of times as the length (m) of the first key (s), labeling is performed.

In other words, the server 20 allocates the same binary label as the user to 'q' persons selected from a plurality of other persons (S122), and allocates a label, which is not the same as the user, to the rest (p-q' persons) not selected from a plurality of other persons (S123).

For example, when a label 1 is allocated to the user, the label 1 may be assigned to 'q' persons, and '0' may be assigned to the rest (p-q persons).

Figure 7:
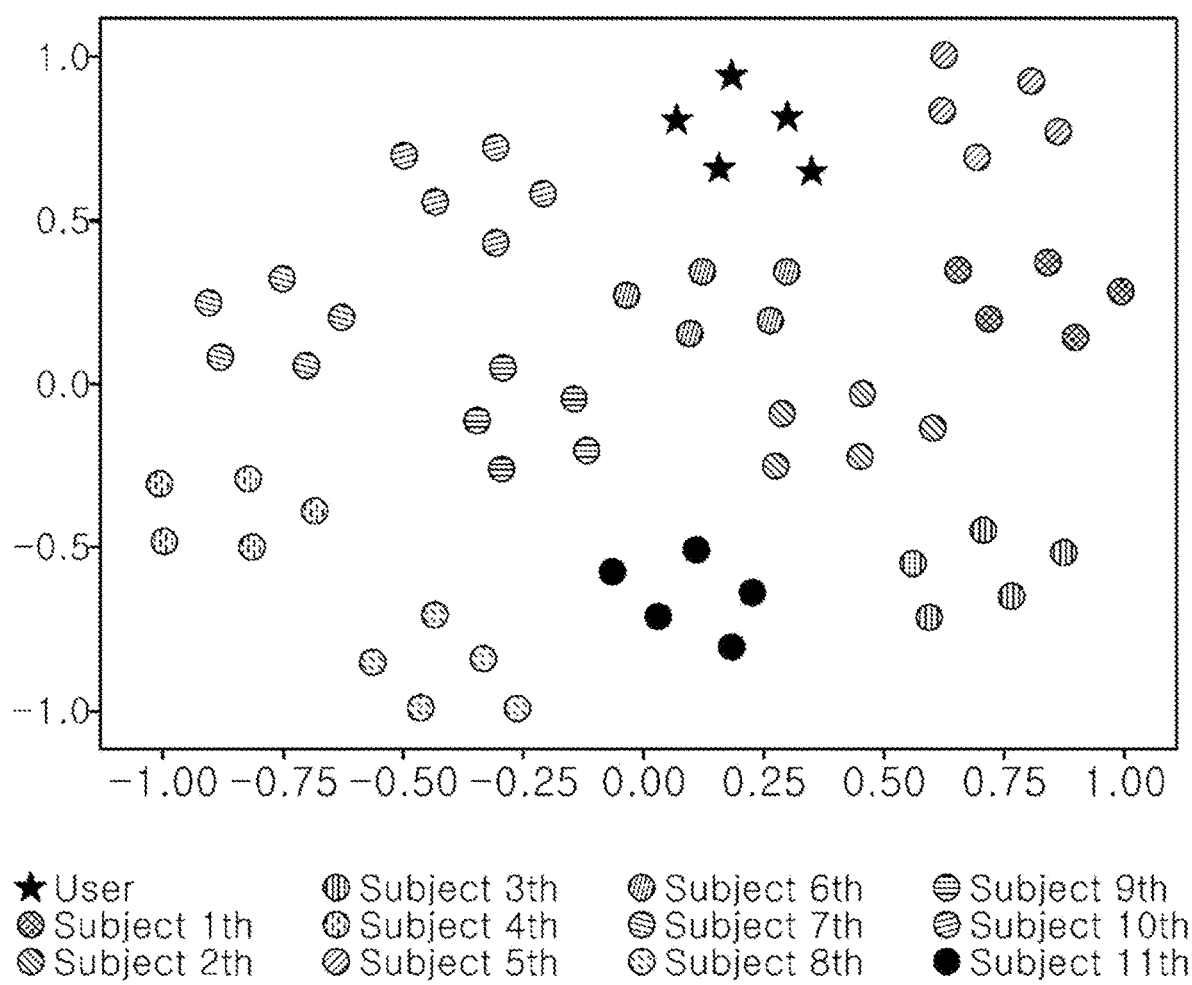
FIGS. 7 to 10 are diagrams for describing a Full Entropy Hash (FEHash) according to an embodiment of the inventive concept.

Referring to FIG. 7, the feature information extracted from the user's biometric information for enrollment and the feature information extracted from biometric information of 11 other persons randomly selected are listed together in an input space.

Figure 8A:
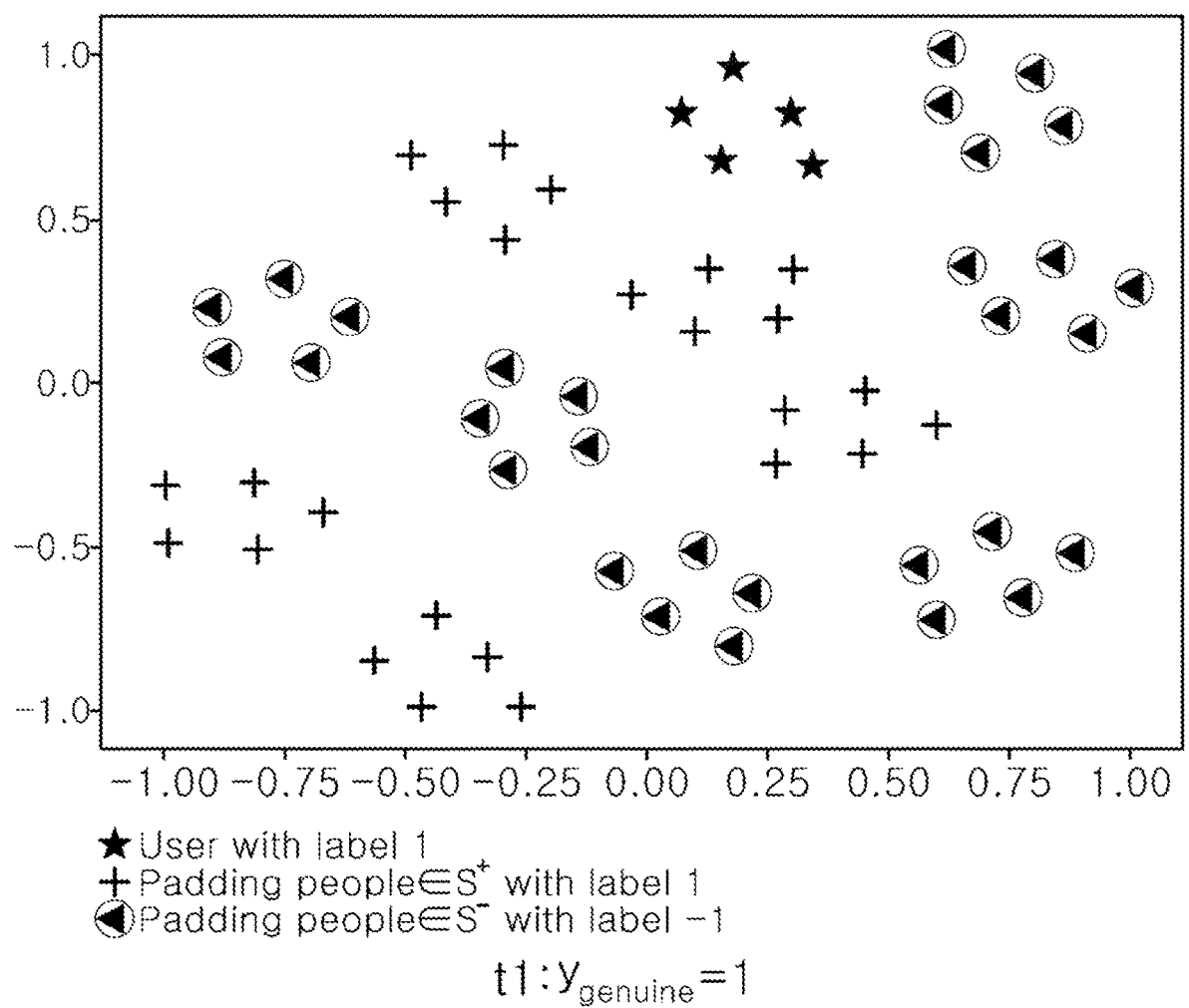

Referring to FIGS. 8A, 8B, and 11, other persons (p) are included in the set (S). At this time, 'q' persons are randomly selected from 11 other persons (p) and then classified into two subsets, that is, $S^+$ and $S^-$. Persons to whom the same binary label as the user is allocated are included in $S^+$, and people to whom a binary label different from that of the user are allocated are included in $S^-$.

When training data is generated by converting the feature information into binary information (i.e., by embedding), the server 20 trains FEHash using training data. In this process, the server 20 generates a projection parameter and a decision hyperplane parameter (S130).

Here, the projection parameter includes a random matrix ($\Omega$) and a random vector (r), and the decision hyperplane parameter includes a vector (w) and a scalar value (b).

That is, as illustrated in FIG. 2, the server applies FEHash to the result of embedding feature information extracted from the biometric information for enrollment and the biometric information of a plurality of other persons, generates the projection parameters ($\Omega$, r) and the decision hyperplane parameters (w, b), and stores these values.

The FEHash refers to the process of generating a classifier that finds the genuine user from the embedding result of the user's biometric information and the biometric information of a plurality of other persons.

That is, the server 20 may apply FEHash to training data obtained by embedding feature information of the user and a plurality of other persons, using the first key (s) as a ground truth label for training the FEHash, and may generate a classifier that may find the genuine user.

Herein, the first key (s) is composed of a random binary string of a predetermined length (m), and is generated in advance by a random key generator. When the length (m) of the first key (s) is 8, the first key (s) may be generated as an 8-bit key composed of '1' and '0'. For example, the first key (s) may be generated as the bit string of '10110011'.

Herein, it is described that the first key (s) is 8 bits. However, the first key (s) may be generated such that the first key (s) is sufficiently arbitrary and has a long length to the extent to which enemies are unpredictable.

The FEHash includes Random Fourier Feature Mapping (RFFM) and Linear Support Vector Machine (Linear SVM).

When S130 is described in detail with reference to FIG. 6, the server 20 performs high-dimensional mapping by applying RFFM to the result of embedding the feature information extracted from the biometric information for enrollment and the biometric information of a plurality of other persons (S131).

Figure 9B:
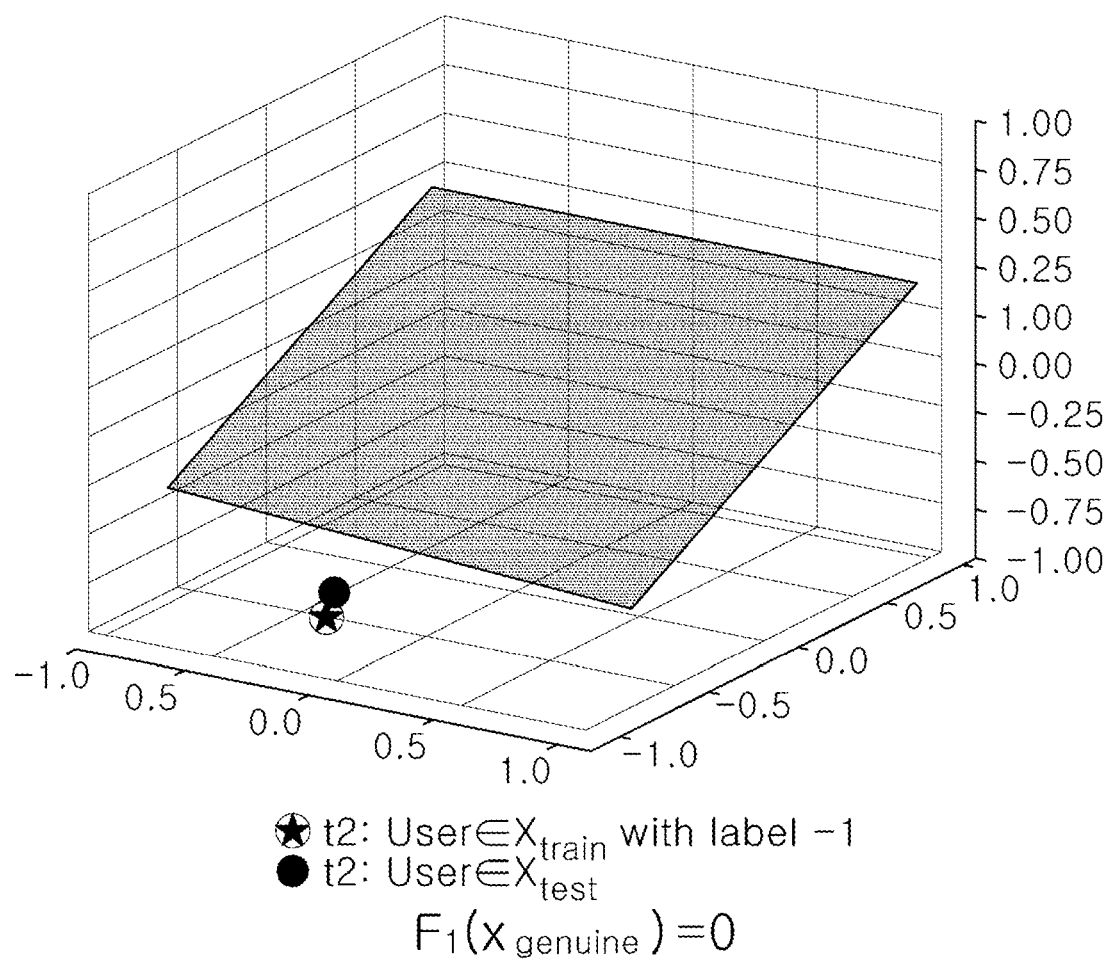

That is, referring to FIGS. 9A and 9B, the server 20 maps the embedded result (training data) into a high-dimensional space, using RFFM in an input space.

The server 20 maps the d-dimensional input signal to D dimension based on the following equation. In the following equation, 'x' is an input signal; $\Omega$ is a random matrix; 'r' is a random vector; $\Omega$ and 'r' are projection parameter values generated in the RFFM process.

$$\phi(x) \triangleq \sqrt{\frac{2}{D}} \cos(\langle \Omega, x \rangle + r)$$

Herein, $\Omega \in \mathbb{R}^{D \times d}$, $r \in [0, 2\pi]^D$.

Returning to FIG. 6, the server 20 determines the same number of hyperplanes as the bit string of the first key (s) by applying Linear SVM to the mapping result of S131 (S132).

The server 20 finds 'm' hyperplanes generating the results of '0' and '1' to be matched with the sequence of the first key (s) of length 'm' composed of '0' and '1', using the Linear SVM. That is, the server 20 determines the optimal hyperplane by finding an SVM parameter capable of classifying '0' and '1' to be matched with the bit string of the randomly-generated first key (s).

Figure 10:
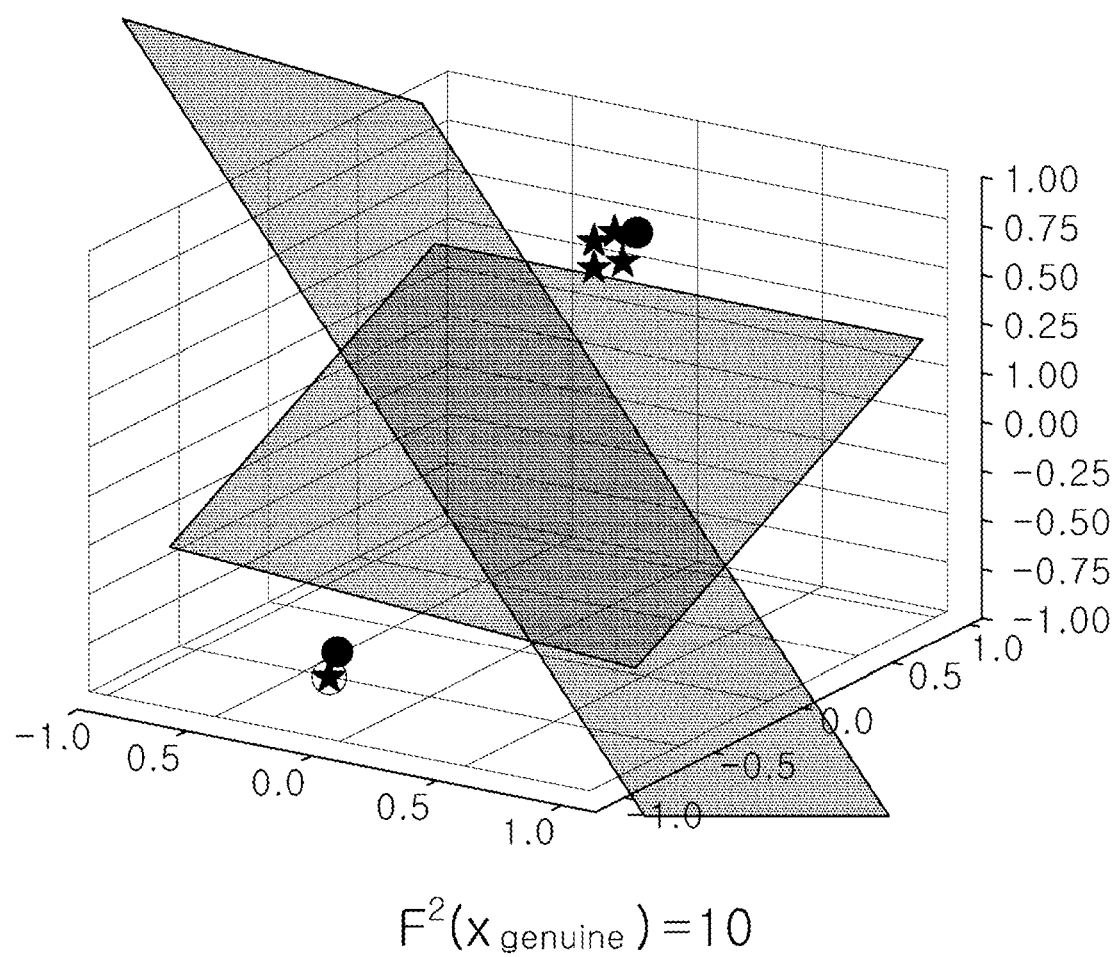

Referring to FIG. 10, when the length of the first key (s) is 2, the server 20 may determine 2 hyperplanes.

The server 20 determines the number of hyperplanes that is the same as the bit sequence of the first key (s), based on the following equation. In the following equation, w* means the optimal solution of Linear SVM. 'w' is a vector and 'b' is a scalar value; 'w' and 'b' are parameter values generated in a Linear SVM process.

$$w^* = \underset{w}{\operatorname{argmin}} \|w\|_2$$

$$b^* = -\frac{\max_{y_i=-1}(\langle w^*, \phi(x_i) \rangle) + \min_{y_i=1}(\langle w^*, \phi(x_i) \rangle)}{2}$$

Referring back to FIG. 6, the server 20 generates a projection parameter randomly, and determines a decision hyperplane parameter based on the projection result (S133).

Referring back to FIG. 3, the server 20 generates a first template (template, pk) by applying a cryptographic hashing function to the pre-generated first key (s) (S140).

The server 20 stores the first template (pk) generated in S140.

User enrollment is completed through the process of S100 to S140. That is, a classifier that determines the number of hyperplanes the same as the bit string of the first key (s) is generated by applying the FEHash to the embedding result based on the randomly-generated first key (s). In this process, a plurality of parameters are generated and stored. At the same time, the user enrollment is completed by applying a cryptographic hashing function to the first key (s) to generate the first template (pk).

The server 20 receives a verification request signal including the user's biometric information for verification from the user terminal 10 (S150).

The server 20 extracts feature information from the user's biometric information for verification (S160).

In the same manner as a user enrollment process, the server 20 extracts feature information of a face image for verification, using a convolutional neural network (CNN) in a user verification process. However, an embodiment is not limited thereto, and various deep learning techniques may be used to extract feature information.

The server 20 embeds feature information extracted from the biometric information for verification (S170).

The embedding refers to a procedure of converting the feature information into binary information.

The server 20 generates a second key (key, s') corresponding to the first key (s) based on the embedding result, using the parameter set ($\Omega$, r, w, b) stored in the enrollment process (S180).

The server 20 generates the second key (key, s') by applying FEHash to the result of embedding feature information extracted from biometric information for verification using the projection parameters and the decision hyperplane parameters.

That is, when verification is requested by the user, the server 20 generates the second key (s') corresponding to the first key (s) from the user's biometric information for verification, using the projection parameter (i.e., random matrix ($\Omega$) and random vector (r)) and the decision hyperplane parameter (i.e., vector (w) and scalar value (b)) stored during user enrollment.

The second key (s') is composed of '1' and '0' and is generated with the same length as the first key (s). For example, when the first key (s) has 8 bits, the second key (s') may also be generated with the length of 8 bits.

The server 20 generates the second template (template, pk') by applying a cryptographic hashing function to the second key (s') (S190).

That is, the server 20 generates the second template (pk') by applying the same cryptographic hashing function as the cryptographic hashing function applied upon generating the first template (pk) to the second key (s').

At this time, when the user requesting verification is the same as the enrolled user, the second key (s') is generated such that the length and the bit string of the second key (s') are identical to the length and the bit string of the first key (s). For example, when the first key (s) is '11001010', the second key (s') may also be generated as '11001010'.

When the user requesting verification is different from the enrolled user (i.e., when another person other than the user requests verification), the second key (s') is generated such that the length of the second key (s') is identical to the length as the first key (s) but the bit string of the second key (s') is different from the bit string as the first key (s). For example, when the first key (s) is '11001010', the second key (s') may be generated as '11000001'.

The server 20 compares the first template (pk) with the second template (pk') (S200), and then completes the user verification based on the comparison result (S210).

When the first template (pk) is the same as the second template (pk'), the server 20 approves the user verification by determining that the user requesting verification is a normal user.

When the first template (pk) is not the same as the second template (pk'), the server 20 returns the user verification as "negative" by determining that the user requesting verification is an abnormal user.

In the meantime, the first key (s) generated in advance by the random key generator may be changed and canceled if necessary.

When the information stored during enrollment is exposed or when the request of the user is present, the server 20 may change and cancel the first key (s) by generating a new key (z) by a random key generator. The server 20 generates new parameter values and a new first template (pk) through the same enrollment process (S100 to S140) based on the new key (z). Afterward, upon requesting verification, the server 20 generates the second key (s'), using newly-generated parameter values, and may perform user verification by comparing the second template (pk') with the newly-generated first template (pk).

As described above, in the inventive concept, a user's biometric information is combined by applying FEHash to the first key (s) pre-generated separately by the user. A first template (pk) is generated and stored by storing the projection parameter value and the decision hyperplane parameter value, which are generated in this process, and simultaneously applying a cryptographic hashing function to the first key (s).

The user may find a second key (s'), of which the hashing result is the same as the first key (s), from biometric information without remembering the long and difficult first key (s), by applying the projection parameter value and decision hyperplane parameter value, which are stored in the enrollment process, to biometric information for verification to find the second key (s') when verification is necessary, and by applying the same cryptographic hashing function as the cryptographic hashing function in the enrollment process to the second key (s'), calculating the second template (pk'), and comparing the first template (pk) with the second template (pk'). Accordingly, the user may use very secure security tokens without remembering security tokens.

Besides, because only the parameter values not associated with personal information generated in the process of applying the user's FEHash are stored without storing the user's personal information when the user is enrolled, the user's personal information is not leaked even when parameter values are leaked.

Furthermore, in the case where changes are necessary because the first key (s) is exposed, a new key (z) may be used when the new key (z) is generated and the same process is applied. This is not provided in the conventional biometric encryption method.

The method for verifying a user through a security token combined with biometric information processing techniques according to an embodiment of the inventive concept may be implemented by a program (or an application) and may be stored in a medium such that the program is executed in combination with a computer being hardware.

The above-described program may include a code encoded by using a computer language such as C, C++, JAVA, Ruby, a machine language, or the like, which a processor (CPU) of the computer may read through the device interface of the computer, such that the computer reads the program and performs the methods implemented with the program. The code may include a functional code related to a function that defines necessary functions that execute the method, and the functions may include an execution procedure related control code necessary for the processor of the computer to execute the functions in its procedures. Furthermore, the code may further include additional information that is necessary for the processor of the computer to execute the functions or a memory reference related code on which location (address) of an internal or external memory of the computer should be referenced by the media. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distributed manner.

The above-mentioned description of the inventive concept is intended to be illustrative, and it should be understood by those skilled in the art that the inventive concept may be embodied in other specific forms without departing from the spirit or essential characteristics thereof. Therefore, the above-described embodiments are exemplary in all aspects, and should be construed not to be restrictive. For example, each component described in a single type may be implemented in a distributed manner, and similarly, components described as being distributed may be implemented in a combined form.

The scope of the inventive concept is defined by claims to be described below rather than the detailed description, and it should be interpreted that the scopes or claims of the inventive concept and all modifications or changed forms derived from the equivalent concept are included in the scopes of the inventive concept.

According to the above-described embodiment of the inventive concept, it is possible to use an encryption key combined with biometric information processing techniques without storing biometric information-related data corresponding to a user's personal information, by generating a binary encryption key that is sufficiently random and long to the extent to which enemies do not predict keys, through a random key generator, generating a hyperplane by the length of the binary encryption key, depending on the bit permutation of the binary encryption key using the biometric information (noise) of other persons different from a user, and storing parameters of the hyperplane. Accordingly, it is possible to use a secure encryption key without remembering the secure encryption key while not exposing personal information.

Furthermore, an encryption key is generated through a separate generator without directly generating an encryption key from biometric information and biometric information processing techniques are used to find the encryption key. Accordingly, even though the conventional encryption key is exposed, a new encryption key may be generated again through a random key generator, and parameters required in a procedure of processing the biometric information, which is capable of finding the encryption key through the same FEHash process, may be newly generated.

The effects of the present inventive concept are not limited to the aforementioned effects, and other effects not mentioned herein will be clearly understood from the following description by those skilled in the art to which the inventive concept pertains.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A user verifying method by a security token combined with biometric information processing techniques, which is performed by a server, the method comprising:
    receiving an enrollment request signal including biometric information for enrollment from a user terminal;
    extracting feature information from the biometric information for the enrollment and biometric information of a plurality of other persons;
    embedding the feature information extracted from the biometric information for the enrollment and the biometric information of the plurality of other persons;
    generating a first key composed of a random binary string;
    generating projection parameters by performing high-dimensional mapping to the result of said embedding the feature information for the enrollment, wherein said performing high-dimensional mapping is performed by using Random Fourier Feature Mapping (RFFM);
    determining hyperplanes using Linear Support Vector Machine (Linear SVM) such that each of the hyperplanes classifies the result of said performing high-dimensional mapping to match with each bit value of the first key, wherein the number of hyperplanes equals to the number of bits of the first key;
    obtaining decision hyperplane parameters of the determined hyperplanes;
    storing the projection parameters and the decision hyperplane parameters;
    generating a first template by applying a cryptographic hashing function to the first key;
    storing the generated first template;
    receiving a verification request signal including biometric information for verification from the user terminal;
    extracting feature information from the biometric information for the verification;
    embedding the feature information extracted from the biometric information for the verification;
    generating a second key corresponding to the first key based on the embedding result;
    generating a second template by applying the cryptographic hashing function to the second key;
    comparing the first template with the second template; and
    completing user verification based on the comparison result.

2. The method of claim 1, wherein the extracting of the feature information from the biometric information for the enrollment and the biometric information of the plurality of other persons includes:
    padding the feature information extracted from the biometric information of the plurality of other persons.

3. The method of claim 1, wherein the embedding of the feature information extracted from the biometric information for the enrollment and the biometric information of the plurality of other persons includes:
    selecting 'q' persons among the plurality of other persons based on a length (m) of the random binary string of the first key;
    allocating a first binary label identical to a binary label of a user to the selected 'q' persons; and
    allocating a second binary label, which are not identical to the binary label of the user, to the remaining persons ('p-q' persons) selected among the plurality of other persons.

4. The method of claim 3, wherein the selecting of the 'q' persons includes:
    selecting the 'q' persons according to an equation below:
    $pCq >= m$ (Here, 'C' means a combination; 'p' is the number of other persons;
    'q' is the number of persons selected among the plurality of other persons; and 'm' is the length of the random binary string of the first key.

5. The method of claim 1, wherein the projection parameters include a random matrix ($\Omega$) and a random vector (r), and
    wherein the decision hyperplane parameters include a vector (w) and a scalar value (b).

6. The method of claim 1, wherein the comparing includes:
    determining whether the first template is identical to the second template.

7. The method of claim 6, wherein the completing of the user verification includes:
    completing the user verification by determining that a user is a normal user, when the first template is identical to the second template.

8. The method of claim 1, wherein the extracting of the feature information from the biometric information for the enrollment and the biometric information of the plurality of other persons includes:
    extracting the feature information extracted from the biometric information for the enrollment and the biometric information of the plurality of other persons, using convolutional neural network (CNN).

9. A non-transitory computer-readable recording medium storing a computer program configured to be executed by one or more hardware processors, to perform a user verifying method by a security token combined with biometric information processing techniques, the computer program being configured to execute:

receiving an enrollment request signal including biometric information for enrollment from a user terminal;
extracting feature information from the biometric information for the enrollment and biometric information of a plurality of other persons;
embedding the feature information extracted from the biometric information for the enrollment and the biometric information of the plurality of other persons;
generating a first key composed of a random binary string;
generating projection parameters by performing high-dimensional mapping to the result of said embedding the feature information for the enrollment, wherein said performing high-dimensional mapping is performed by using Random Fourier Feature Mapping (RFFM);
determining hyperplanes using Linear Support Vector Machine (Linear SVM) such that each of the hyperplanes classifies the result of said performing high-dimensional mapping to match with each bit value of the first key, wherein the number of hyperplanes equals to the number of bits of the first key;
obtaining decision hyperplane parameters of the determined hyperplanes;
storing the projection parameters and the decision hyperplane parameters;
generating a first template by applying a cryptographic hashing function to the first key;
storing the generated first template;
receiving a verification request signal including biometric information for verification from the user terminal;
extracting feature information from the biometric information for the verification;
embedding the feature information extracted from the biometric information for the verification;
generating a second key corresponding to the first key based on the embedding result;
generating a second template by applying the cryptographic hashing function to the second key;
comparing the first template with the second template; and
completing user verification based on the comparison result.

10. A server performing a user verifying method, the server comprising:
a memory;
one or more hardware processors configured to:
when an enrollment request signal including biometric information for enrollment is received from a user terminal,
extract feature information from the biometric information for the enrollment and biometric information of a plurality of other persons;
embed the feature information extracted from the biometric information for the enrollment and the biometric information of the plurality of other persons;
generate a first key composed of a random binary string;
generate projection parameters by performing high-dimensional mapping to the result of said embed the feature information for the enrollment, wherein said performing high-dimensional mapping is performed by using Random Fourier Feature Mapping (RFFM);
determine hyperplanes using Linear Support Vector Machine (Linear SVM) such that each of the hyperplanes classifies the result of said performing high-dimensional mapping to match with each bit value of the first key, wherein the number of hyperplanes equals to the number of bits of the first key;
obtain decision hyperplane parameters of the determined hyperplanes;
store the projection parameters and the decision hyperplane parameters in the memory; and
generate a first template by applying a cryptographic hashing function to the first key;
store the generated first template in the memory;
when a verification request signal including biometric information for the verification is received from the user terminal,
extract feature information from the biometric information for verification;
embed the feature information extracted from the biometric information for the verification;
generate a second key corresponding to the first key based on the embedding result;
generate a second template by applying the cryptographic hashing function to the second key;
compare the first template with the second template; and
complete user verification based on the comparison result.

11. The server of claim 10, wherein the one or more processors pads the feature information extracted from the biometric information of the plurality of other persons.

12. The server of claim 10, wherein the one or more processors selects 'q' persons among the plurality of other persons based on a length (m) of the random binary string of the first key;
allocates a first binary label identical to a binary label of a user to the selected 'q' persons;
allocates a second binary label, which is not identical to the binary label of the user, to the remaining persons ('p-q' persons) selected among the plurality of other persons; and
selects the 'q' persons according to an equation below when selecting the 'q' persons:
pCq>=m (Here, 'C' means a combination; 'p' is the number of other persons;
'q' is the number of persons selected among the plurality of other persons; and 'm' is the length of the first key.

13. The server of claim 10, wherein the projection parameters include a random matrix (Ω) and a random vector (r), and
wherein the decision hyperplane parameters include a vector (w) and a scalar value (b).

14. The server of claim 10, wherein the one or more processors determines whether the first template is identical to the second template, and
completes the user verification by determining that a user is a normal user, when the first template is identical to the second template.

15. The server of claim 10, wherein the one or more processors extracts the feature information extracted from the biometric information for the enrollment and the biometric information of the plurality of other persons, using CNN.

* * * * *